(12) United States Patent
Tajima (10) Patent No.: US 8,625,128 B2
(45) Date of Patent: Jan. 7, 2014

(54) INFORMATION-PROCESSING DEVICE, AN INFORMATION-PROCESSING SYSTEM, AND A STORING MEDIUM

(75) Inventor: Yukio Tajima, Ebina (JP)

(73) Assignee: Fuji Xerox Co., Ltd., Tokyo (JP)

( * ) Notice: Subject to any disclaimer, the term of this patent is extended or adjusted under 35 U.S.C. 154(b) by 549 days.

(21) Appl. No.: 12/432,049

(22) Filed: Apr. 29, 2009

(65) Prior Publication Data

US 2010/0073710 A1    Mar. 25, 2010

(30) Foreign Application Priority Data

Sep. 24, 2008    (JP) .................................. 2008-244709

(51) Int. Cl.
*G06F 15/00*    (2006.01)

(52) U.S. Cl.
USPC .......................................... 358/1.15; 709/219

(58) Field of Classification Search
None
See application file for complete search history.

(56) References Cited

U.S. PATENT DOCUMENTS

| | | |
|---|---|---|
| 2004/0205376 A1 | 10/2004 | Iida |
| 2005/0027825 A1* | 2/2005 | Hikawa et al. ................ 709/219 |
| 2005/0206913 A1 | 9/2005 | Matsuda et al. |
| 2007/0154076 A1* | 7/2007 | Numata et al. ................ 382/128 |
| 2007/0226261 A1* | 9/2007 | Urita ........................ 707/104.1 |
| 2008/0002220 A1* | 1/2008 | Song ........................... 358/1.15 |
| 2008/0147773 A1* | 6/2008 | Aaron .......................... 709/201 |
| 2009/0091783 A1* | 4/2009 | Kazume et al. ............... 358/1.15 |
| 2009/0207460 A1* | 8/2009 | Hikawa et al. ................ 358/448 |
| 2009/0257090 A1* | 10/2009 | Ozawa et al. ................ 358/1.15 |

FOREIGN PATENT DOCUMENTS

| | | |
|---|---|---|
| JP | 2004-157676 A | 6/2004 |
| JP | 2004-288026 A | 10/2004 |
| JP | 2005-295515 A | 10/2005 |
| JP | 2006-277696 A | 10/2006 |
| JP | 2006-302038 A | 11/2006 |

OTHER PUBLICATIONS

Office Action issued in Japanese Patent Application No. 2008-244709 dated Jan. 22, 2013.
Office Action issued in the Japanese Patent Application No. 2008-244609 on Apr. 2, 2013.

* cited by examiner

*Primary Examiner* — Twyler Haskins
*Assistant Examiner* — Helen Q Zong
(74) *Attorney, Agent, or Firm* — Sughrue Mion, PLLC (57) ABSTRACT

An information-processing device includes: an execution unit that executes a first part of a process, based on process instruction data representing a process including a first part and a second part of the process, the first part and the second part of the process performed by the information-processing device and an external device, respectively; an instruction unit that instructs the external device to execute the second part of the process; a receiving unit that receives data from the external device regarding the history of the second part of the process; and a memory that stores data regarding the history of the first part of the process and data received by the receiving unit.

8 Claims, 8 Drawing Sheets

```
<OcrLang>ja</OcrLang>
    <OutputFileFormat>PDF</OutputFileFormat>
```

FIG. 8

```xml
<?xml version="1.0" encoding="UTF-8"?>
<JobTemplate>
  <Name>Sample</Name>
  <Process>
    <DocumentInput>
      <Scan>
        <InputSize>A4</InputSize>
        <InputDirection>LEF</InputDirection>
        <ColorMode>Auto</ColorMode>
        <Magnification>100%</Magnification>
      </Scan>
    </DocumentInput>
    <DocumentProcess>
      <WebService>
        <Name>OcrAndStore</Name>
        <Target>http://192.168.4.5/OcrAndStoreService.amsx</Target>
        <FileTransfer>attachment</FileTransfer>
        <Message>
          <DocumentProcess>
            <WebService>
              <Name>Ocr</Name>
              <Target>http://192.168.4.10/OcrService.amsx</Target>
              <FileTransfer>attachment</FileTransfer>
              <Message>
                <OcrLang>ja</OcrLang>
                <OutputFileFormat>PDF</OutputFileFormat>
              </Message>
            </WebService>
            <FileStore>
              <StoreLocation>/home/document/archive/</StoreLocation>
            </FileStore>
          </DocumentProcess>
        </Message>
      </WebService>
    </DocumentProcess>
  </Process>
</JobTemplate>
```

```
<DocumentProcess>
    <WebService>
      <Name>Ocr</Name>
      <Target>http://192.168.4.10/OcrService.amsx</Target>
      <FileTransfer>attachment</FileTransfer>
      <Message>
        <OcrLang>ja</OcrLang>
        <OutputFileFormat>PDF</OutputFileFormat>
      </Message>
    </WebService>
    <FileStore>
      <StoreLocation>/home/document/archive/</StoreLocation>
    </FileStore>
  </DocumentProcess>
```

| PROCESS LIST | | ☒ |
|---|---|---|
| PROCESS IDENTIFIER | RESULT | PROCESS NAME |
| A0001 | SUCCESS | Sample |
| A0002 | SUCCESS | Scan |
| A0002 | SUCCESS | WebService |
| B0001 | SUCCESS | OcrAndstore |
| B0002 | SUCCESS | WebService |
| C0001 | SUCCESS | Ocr |
| B0003 | SUCCESS | FileStore |

INFORMATION-PROCESSING DEVICE, AN INFORMATION-PROCESSING SYSTEM, AND A STORING MEDIUM

CROSS-REFERENCE TO RELATED APPLICATIONS

This application is based on and claims priority under 35 U.S.C. 119 from Japanese Patent Application No. 2008-244709, which was filed on Sep. 24, 2008.

TECHNICAL FIELD

The present invention relates to an information-processing device, an information-processing system, and a storing medium storing a computer program.

BACKGROUND

A portal server device that manages a history of collaboration between multiple applications executed by a computer device has been developed.

SUMMARY

According to an aspect of the present invention, there is provided an information-processing device including: an execution unit that executes a first part of a process, based on process instruction data representing a process including a first part and a second part of the process, the first part and the second part of the process performed by the information-processing device and an external device, respectively; an instruction unit that instructs the external device to execute the second part of the process; a receiving unit that receives data from the external device regarding the history of the second part of the process; and a memory that stores data regarding the history of the first part of the process and data received by the receiving unit.

BRIEF DESCRIPTION OF THE DRAWINGS

Exemplary embodiments of the present invention are described in detail based on the following figures, wherein.

DETAILED DESCRIPTION

Overall Configuration

Figure 1:
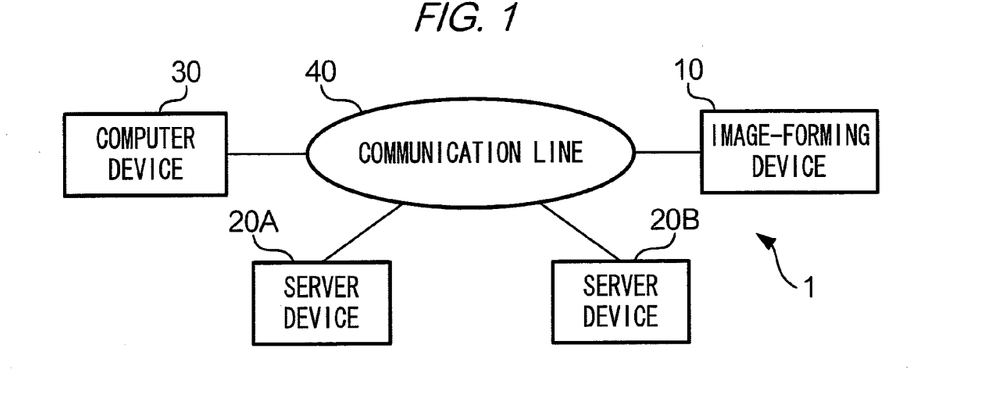
FIG. 1 is an outline diagram of the overall configuration of one exemplary embodiment of the present invention.

FIG. 1 is a diagram illustrating the overall configuration of one exemplary embodiment of the present invention. The image-forming device 10 is a device equipped with a function for reproducing documents, a function for reading a document and generating image data of the read document, and a function for forming an image, shown by the image data, on paper, etc. Furthermore, the server devices 20A and 20B are devices that provide service upon a request from a device that is a client. Moreover, the computer device 30 is a device that executes stored programs, thereby implementing a variety of functions. The respective devices are connected to a communication line 40 that connects the devices to enable communication, allowing communication among each other via the communication line 40. Note that one image-forming device, one computer device, and two server devices are illustrated in FIG. 1, but the communication line 40 may be connected to two or more image-forming devices or computer devices, and may be connected to three or more server devices.

Configuration of the Image-Forming Device 10

Figure 2:
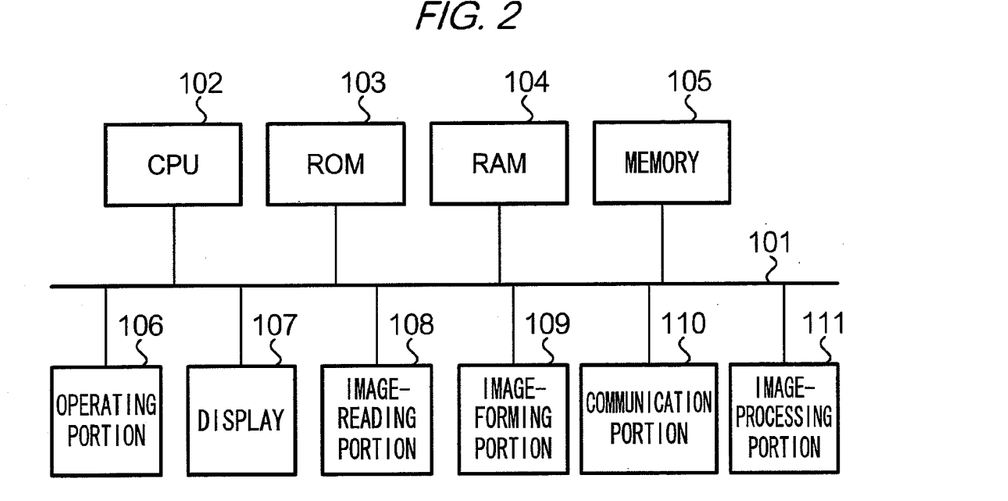
FIG. 2 is a block diagram of the hardware configuration of the image-forming device 10.

FIG. 2 is a block diagram illustrating the hardware configuration of the image-forming device 10 according to the present exemplary embodiment. As shown in the same figure, the respective portions of the image-forming device 10 are connected to a bus 101 and various types of data are transferred via this bus 101.

The operating portion 106 includes multiple operators for operating the image-forming device 10. When a user of the image-forming device 10 operates an operator, the operator that has been operated is detected by a CPU (Central Processing Unit) 102, and the CPU 102 controls the respective portions, depending on the operated operator. The display 107 has a liquid crystal display, for example, as a display device, and displays a menu screen for operating the image-forming device 10, data regarding the image-forming device 10, etc., under the control of the CPU 102. A communication portion 110 is connected to the communication line 40 and functions as a communication interface that communicates with other devices connected to the communication line 40.

The image-reading portion 108 includes an image reader (omitted from the figure) that reads a document, generates image data representing an image of the read document, and outputs the generated image data to the image-processing portion 111. The image-processing portion 111 is for treating an image, represented by image data that is input, with image processing such as color correction and tone correction, generating image data of an image for each color—yellow (Y), magenta (M), cyan (C), and black (K)—from the image treated with image processing, in order to output it to the image-forming portion 109.

The image-forming portion 109 is equipped with image-forming mechanisms (omitted from the figure) to form a toner image on a memory medium such as paper via the electrographic method. Specifically, these image-forming mechanisms include an image-forming mechanism to form a toner image that is yellow (Y) in color, an image-forming mechanism to form a toner image that is magenta (M) in color, an image-forming mechanism to form a toner image that is cyan (C) in color, and an image-forming mechanism to form a toner image that is black (K) in color. After forming an electrostatic latent image on a photoreceptor according to the image data output from the image-processing portion 111, each image-forming mechanism attaches toner to the surface of the photoreceptor to form a toner image of each color of Y, M, C, and K, and transfers this toner image to the memory medium. Then, after applying heat and pressure to the toner image transferred to the memory medium to set it in place, the memory medium on which the toner image has been formed is moved out of the image-forming device 10.

The memory 105 is equipped with a memory device and stores data received by the communication portion 110, data generated by the image-forming device 10, etc. The ROM (Read Only Memory) 103 has stored control programs to be executed by the CPU 102. The CPU 102 reads out a control program stored in the ROM 103 and executes the control program, with the RAM (Random Access Memory) 104 as a working area. When the control program is executed by the CPU 102, the respective portions of the image-forming device 10 are controlled by the CPU 102, allowing the image-forming device 10 to form an image on paper and output it, to read a document and generate image data of the document, to communicate with other devices via the communication line, etc.

Figure 3:
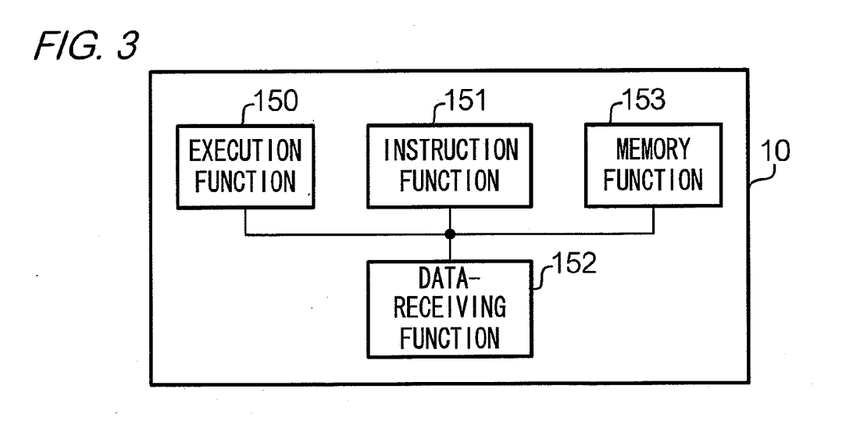
FIG. 3 is a block diagram of functions implemented in the image-forming device.

Furthermore, when the control program is executed by the CPU 102, the functions illustrated in the functional block diagram in FIG. 3 are implemented, thereby implementing an execution function 150 for performing a process based on data that is input, an instruction function 151 for instructing other devices to process data based on data that is input, a data-receiving function 152 for acquiring data regarding processes instructed to other devices, a memory function 153 for storing data acquired from other devices, etc. In this way, because the image-forming device 10 has functions for processing data, it can be the one that it has the functions of an information-processing device.

Configuration of the Server Devices 20A and 20B

Figure 4:
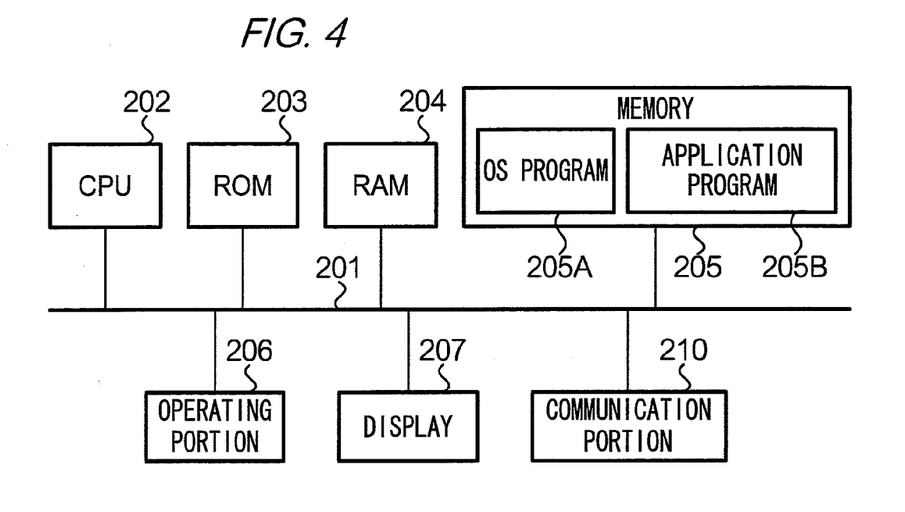
FIG. 4 is a block diagram of the hardware configuration of the server device 20A.

FIG. 4 is a block diagram illustrating the hardware configuration of the server device 20A. As shown in the same figure, the respective portions of the server device 20A are connected to a bus 201, and various types of data are transferred via this bus 201.

The operating portion 206 includes devices for operating the server device 20A, such as a keyboard and a mouse. When these devices are operated by the user of the server device 20A, the CPU 202 performs various types of processes depending on the operation performed. The display 207 has a liquid crystal display as a display device and displays a menu screen for operating the server device 20A, data possessed by the server device 20A, etc., under the control of the CPU 202. The communication portion 210 is connected to the communication line 40 and functions as a communication interface that communicates with other devices connected to the communication line 40.

Figure 5:
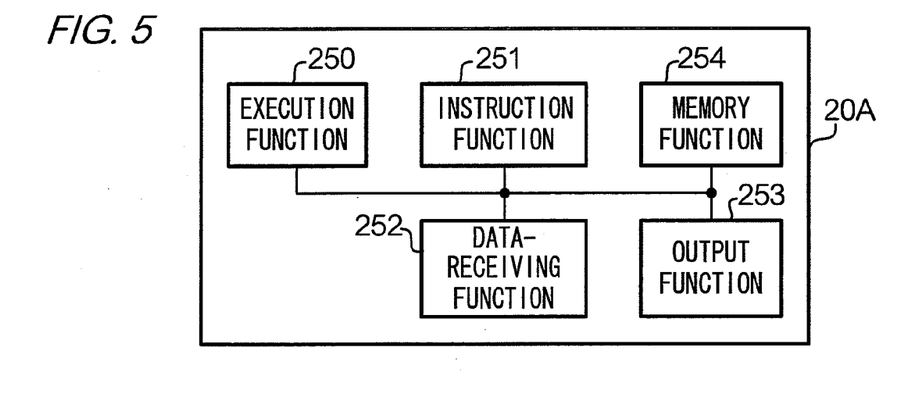
FIG. 5 is a functional block diagram of functions implemented on the server device 20A.

The memory 205 is equipped with a memory device and stores an OS program 205A that implements operating system functions on the server device 20A. Furthermore, the memory 205 interprets the process instruction data that represents the contents of a process to be performed by the server device 20A, and stores the application program 205B that implements the functions illustrated in the functional block diagram in FIG. 5, such as the execution function 250 for performing a process represented by the process instruction data, the instruction function 251 for instructing other devices to process data according to the contents described in the process instruction data, the data-receiving function 252 for acquiring data regarding processes executed by other devices, the output function 253 for outputting data regarding executed processes, the memory function 254 for storing data in the memory 205, etc.

The ROM 203 stores an IPL (Initial Program Loader). When the server device 20A is powered on, the CPU 202 reads out the IPL from the ROM 203 in order to activate it. When the IPL is activated by the CPU 202, the OS program 205A stored in the memory 205 is executed, implementing basic functions as a computer device, such as control of the memory 205, and a communication function for communicating via the communication line 40. Moreover, when the application program 205B is executed by the CPU 202, the various functions described above are implemented.

Figure 6:
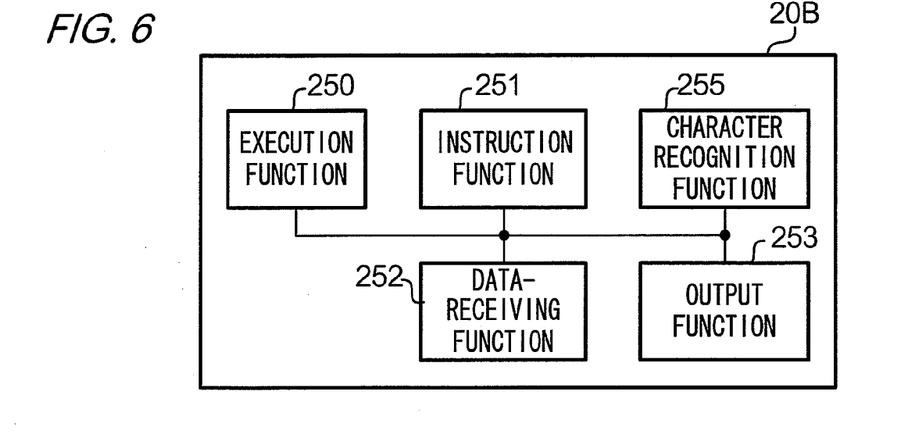
FIG. 6 is a functional block diagram of functions implemented on the server device 20B.

Furthermore, the hardware configuration of the server device 20B is the same as that of the server device 20A, which is the hardware configuration shown in FIG. 4. The server device 20B differs from the server device 20A in that programs stored in the memory 205 are different. Specifically, the memory 205 of the server device 20B stores the application program 205C in place of the application program 205B. When this application program 205C is executed, as shown in the functional block diagram in FIG. 6, the execution function 250, the instruction function 251, the data-receiving function 252, and the output function 253 are implemented, and the character recognition function 255 for recognizing characters in images is implemented in place of the memory function 254.

Configuration of the Computer Device 30

Figure 7:
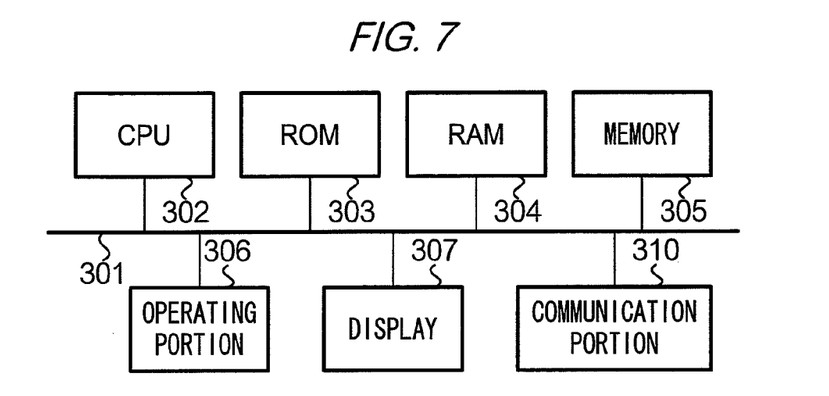
FIG. 7 is a block diagram of the hardware configuration of the computer device 30.

FIG. 7 is a block diagram illustrating the hardware configuration of the computer device 30. As shown in the same figure, the respective portions of the computer device 30 are connected to a bus 301, and various types of data are transferred via this bus 301.

The operating portion 306 includes devices for operating the computer device 30, such as a keyboard and a mouse. When these devices are operated by the user of the computer device 30, the CPU 302 performs various types of processes depending on the operation performed. The display 307 has a liquid crystal display as a display device and displays a menu screen for operating the computer device 30, data possessed by the computer device 30, etc., under the control of the CPU 302. The communication portion 310 is connected to the communication line 40 and functions as a communication interface that communicates with other devices connected to the communication line 40.

The memory 305 is equipped with a memory device and stores an OS program that implements operating system functions on the computer device 30, as well as a data-generating program that implements the function of creating text data.

Figure 8:
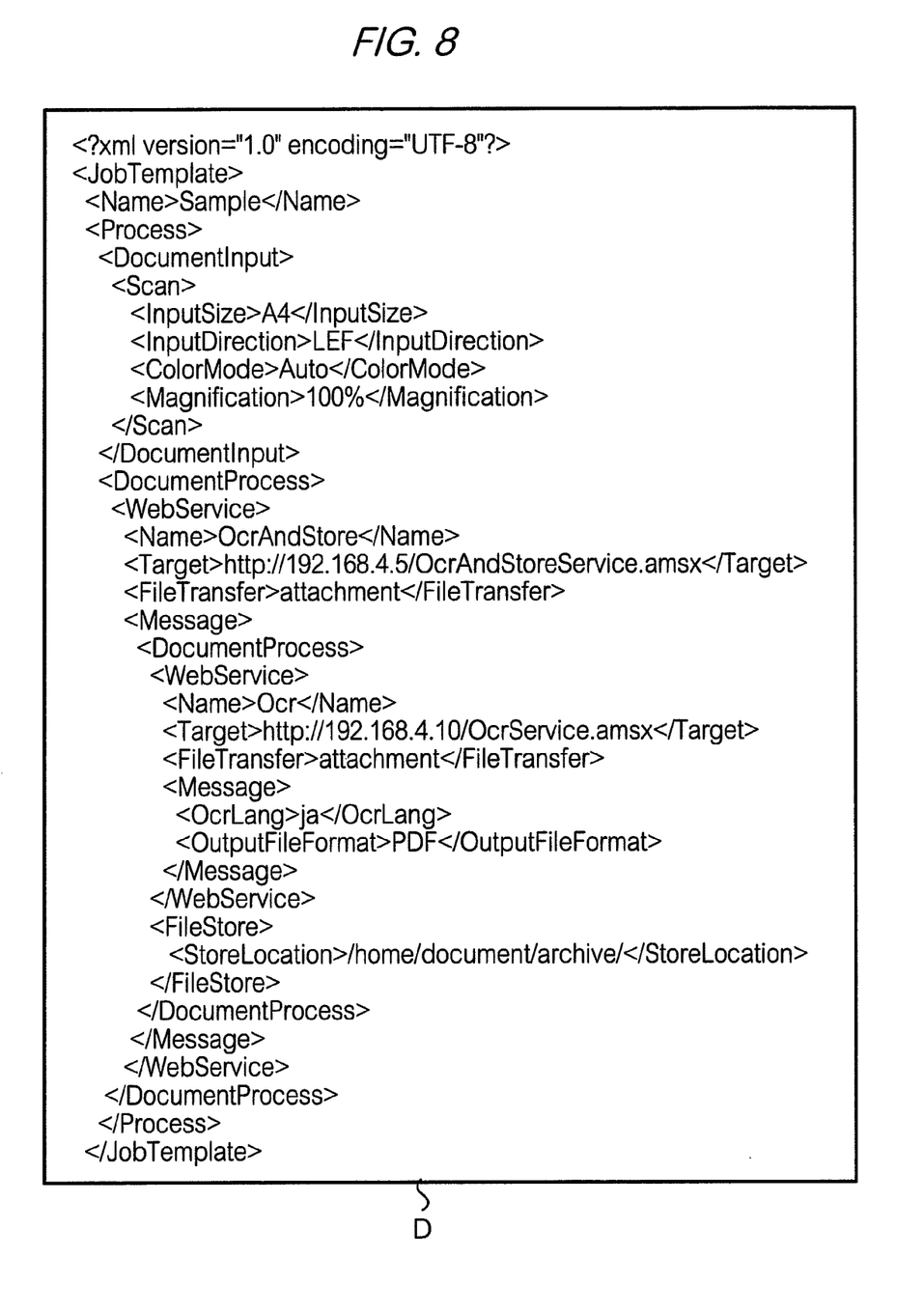
FIG. 8 is a diagram showing the contents of the process instruction data D.

The ROM 303 stores an IPL, and when the computer device 30 is powered on, the CPU 302 reads out the IPL from the ROM 303 in order to activate it. When the IPL is activated by the CPU 302, the OS program stored in the memory 305 is read out and executed, implementing basic functions as a computer device, such as control of the memory 305, and a communication function for communicating via the communication line 40. Furthermore, when a data-generating program is executed by the CPU 302, the function for creating text data is implemented on the computer device 30, allowing for the creation of the process instruction data D that represents a process to be performed by the image-forming device 10 and the server devices 20A and 20B illustrated in FIG. 8. Moreover, the process instruction data D shown in FIG. 8 is data in which processes (actions to be performed or sequences of actions) to be performed by the image-forming device 10 or the server devices 20A and 20B and information regarding actions are described. In the present exemplary embodiment, they are described in XML (eXtensible Markup Language) by way of example, but they may be described in other markup languages, and also, if they are described according to a predefined specification, they do not have to be described with a markup language.

An Example of the Actions of the First Exemplary Embodiment

An example of the actions of the first exemplary embodiment is described as follows. In the following description, the operation when a document is read by the image-forming device 10, which is that the recognition of characters within the document read by the image-forming device 10 is performed by the server device 20B, and the result of character recognition is stored in the server device 20A, are described using FIG. 9.

First, the user of the present exemplary embodiment creates the process instruction data D that represents a process to be performed by the image-forming device 10, a process to be performed by the server device 20A, and a process to be performed by the server device 20B, as illustrated in FIG. 8, on the computer device 30 in order to cause the image-forming device 10 to read a document, to cause the server device 20B to recognize characters in the document read by the image-forming device 10, and to store the result of character recognition on the server device 20A.

Figure 9:
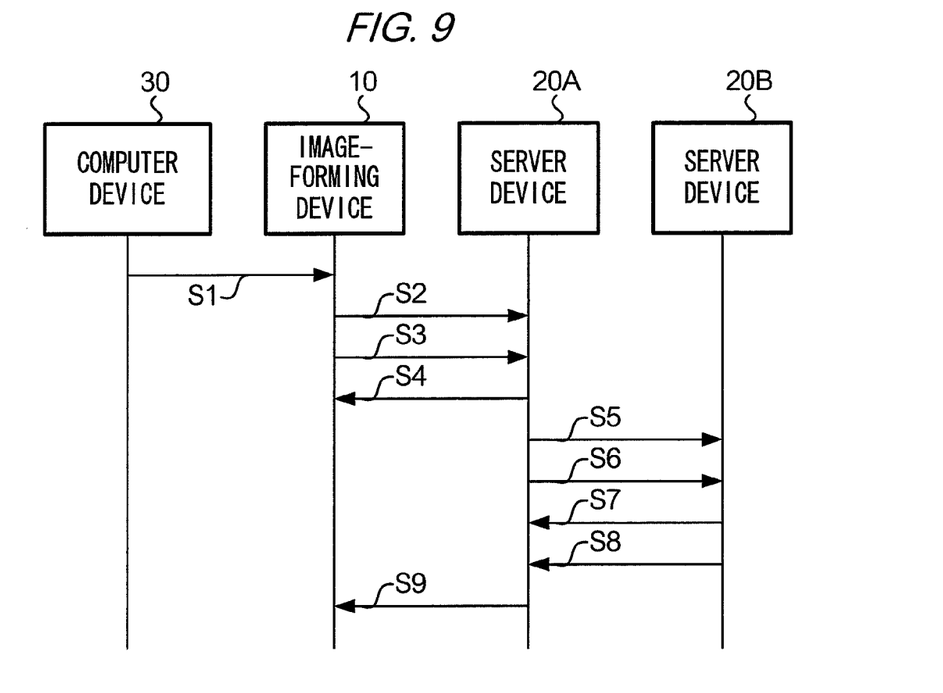
FIG. 9 is a diagram for explaining the action of the exemplary embodiment.

Next, when the operation for instructing the sending of the process instruction data D to the image-forming device 10 is performed by the operating portion 106 of the computer device 30, the communication portion 310 is controlled by the CPU 302, and the process instruction data D is sent to the image-forming device 10 via the communication line 40 (step S1). On the other hand, in the image-forming device 10, this process instruction data D is received by the communication portion 110, and the process instruction data D is stored in the memory 105.

Next, the document is set on the image-reading portion 108 of the image-forming device 10 by the user of the present exemplary embodiment, and an operation for selecting the process instruction data D from data stored in the memory 105 is performed by the operating portion 106. Then, when an operation for instructing the execution of the process represented by the process instruction data D is performed, the CPU 102 analyzes the contents of the process instruction data D from line 1 of the process instruction data D after generating "A0001" as a process identifier for uniquely identifying the process based on the process instruction data D. Moreover, the process identifier is not limited to combinations of letters and numbers, and may be numbers only or letters only.

Figure 10A:
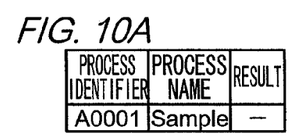
FIG. 10 is a diagram showing data stored in the image-forming device 10.

The CPU 102 analyzes the process instruction data D, extracts the element on line 3, "Sample", between the <Name> tag and the </Name> tag, as the name of the process that will be executed, and associates it with the generated identifier "A0001" (FIG. 10(a)). Moreover, when analyzing the element on line 4 of the process instruction data D, the CPU 102 determines that the elements between the <Process> tag on line 4 and the </Process> tag on line 36 are the contents of the process to be executed.

Figures 10B, 10C, 10D, 10E:
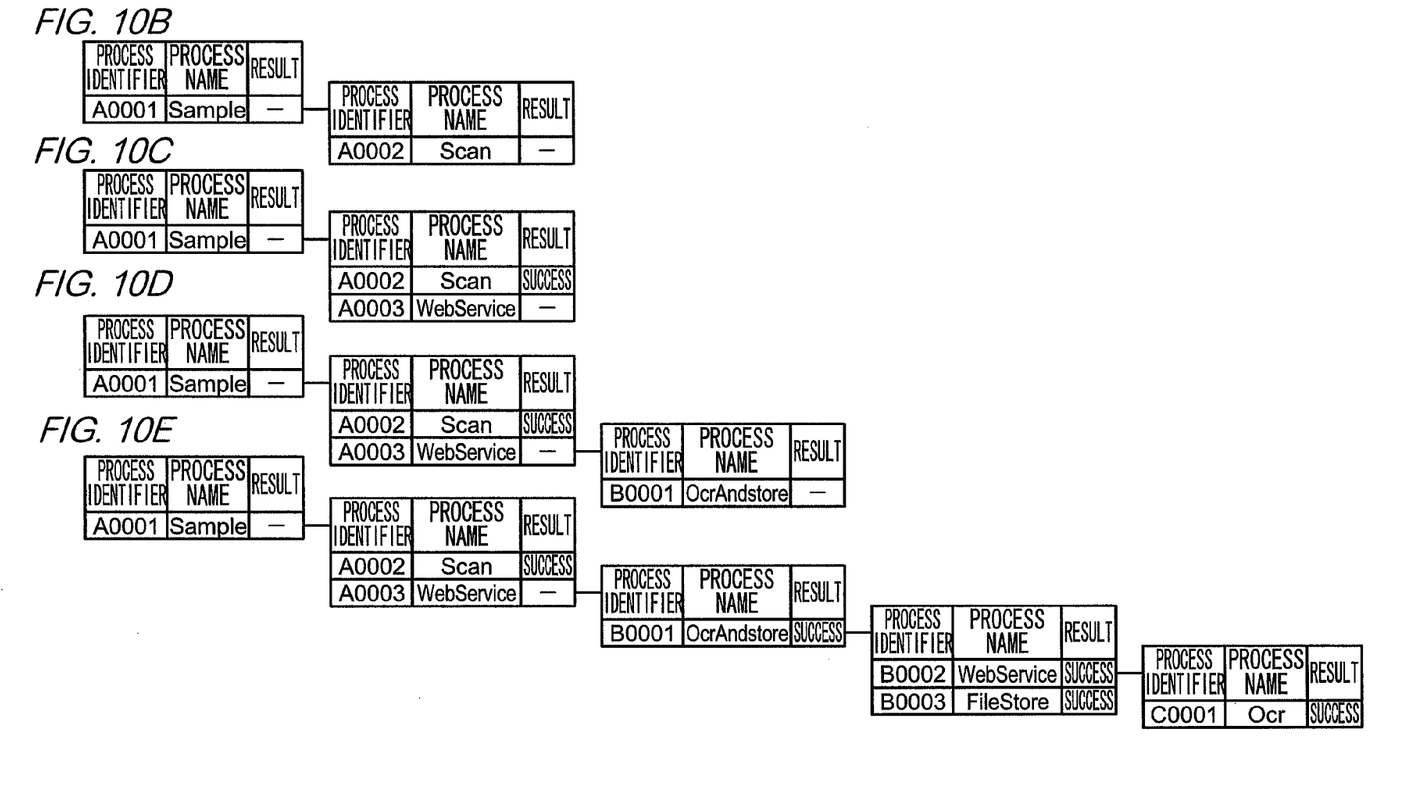

Next, the CPU 102 determines that it is to perform a process of reading the document, because line 5 of the process instruction data D contains the <DocumentInput> tag, and generates "A0002" as a process identifier in order to uniquely identify the process for reading the document. Furthermore, the CPU 102 analyzes the element on the next line 6 as the specific action of reading the document. Here, because the tag on line 6 is a <Scan> tag, the CPU 102 names the process specified by the process identifier "A0002" as "Scan" and associates the process identifier "A0002" with the process name "Scan". Moreover, because the process identifier "A0002" is related to processing of the process identifier "A0001", in the image-forming device 10, the process identifier "A0002" is associated with the process identifier "A0001" (FIG. 10(b)).

Then, because the tag on line 6 is a <Scan> tag, the CPU 102 controls the image-reading portion 108, reads the document set on the image-reading portion 108, and generates image data of the read document. Furthermore, the reading of the document and the generation of the image data are performed based on the elements between the <Scan> tag and the </Scan> tag in the process instruction data D. Specifically, because "A4" follows the tag, "LEF" follows the tag, "Auto" follows the tag, and "100%" follows the tag, the document is read as an A4-sized document longitudinally fed, while regarding the image data that is generated, the magnification of the read image is 100%, and regarding the colors of the image, it is automatically determined whether it is monochrome or colored, and monochrome or colored image data is generated. Here, when image data is generated, the CPU 102 stores, in the memory 105, the process result data "success", indicating that the process of reading the document has been performed, as well as the set consisting of the process identifier "A0002" and the process name "Scan" (FIG. 10(c)).

When the CPU 102 finishes generating image data, because the <DocumentProcess> tag follows the </Scan> tag, that is, in the element on line 13 of the process instruction data D, it determines that the next process to be performed is processing of the process image data, and operates based on the elements between the <DocumentProcess> tag and the </DocumentProcess> tag on line 35. Specifically, because line 14 of the process instruction data D contains a <WebService> tag, the CPU 102 determines that it is to perform a process of instructing other devices to process the image data, generates a process identifier "A0003" in order to uniquely identify the process for instructing other devices to process the image data, and also names the process specified by the process identifier "A0003" "WebService" in order to relate the process identifier "A0003" to the process name "WebService". Moreover, because the process identifier "A0003" is related to processing of the process identifier "A0001", in the image-forming device 10, the process identifier "A0003" is associated with the process identifier "A0001" (FIG. 10(c)).

Figure 13:
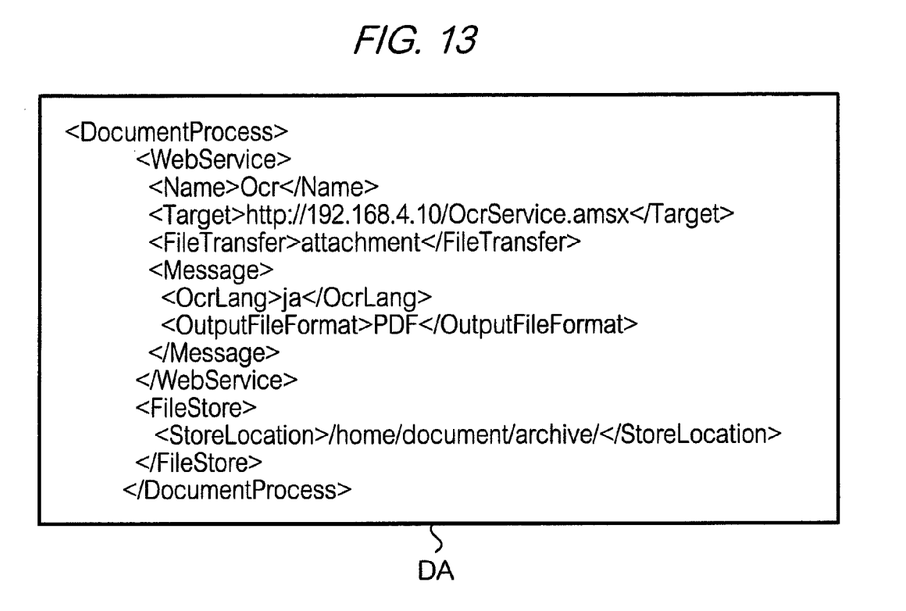
FIG. 13 is a diagram showing the contents of the process instruction data DA.

Next, because there is a <Name> tag on the line following the line with <WebService>, the CPU 102 extracts "OcrAndStore" between the <Name> tag and the </Name> tag as the name of a process to be performed by other devices. Furthermore, because the text strings <Target>http://192.168.4.5/OcrAndStoreService.amsx</Target> and <FileTransfer>attachment</FileTransfer> appear as elements and there are elements inserted between the <Message> tag and the </Message> tag, the communication portion 110 is controlled by the CPU 102, and the image data and a message instructing the execution of the program specified by "OcrAndStoreService.amsx" are sent to the server device 20A specified by the IP (Internet Protocol) address "192.168.4.5" (step S2). Moreover, the elements between the <Message> tag and the </Message> tag are extracted from the process instruction data D, and the process instruction data DA, representing the extracted elements (FIG. 13), is sent to the server device 20A (step S3).

When the image data, message, and process instruction data DA sent from the image-forming device 10 are received by the communication portion 210 of the server device 20A, the CPU 202 executes the application program 205 specified by "OcrAndStoreService.amsx" according to the message and performs tasks based on the process instruction data DA.

Figure 12A:
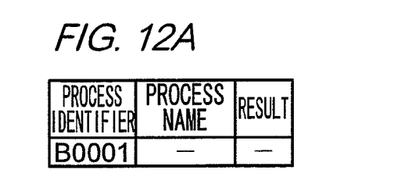
FIG. 12 is a diagram showing data stored on the server device 20A.

Specifically, the CPU 202 first analyzes the contents of the process instruction data DA from line 1 of the process instruction data DA after generating "B0001" as a process identifier for uniquely identifying the process to be performed based on the process instruction data DA (FIG. 12(a)). Furthermore, this process identifier "B0001" is sent to the image-forming device 10 (step S4), associated with the process name "OcrAndStore" in the image-forming device 10, and is stored in the memory 205. Moreover, because the process identifier "B0001" is related to the processing of the process identifier "A0003", in the image-forming device 10, the process identifier "B0001" is associated with the process identifier "A0003" (FIG. 10(d)).

Figure 12B:
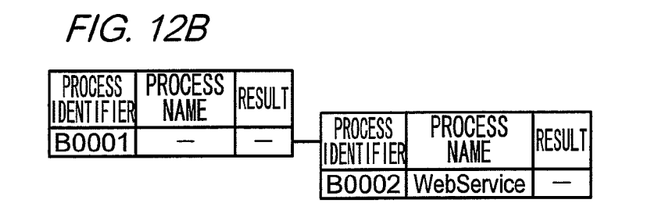

On the other hand, the CPU 202 of the server device 20A analyzes the process instruction data DA and determines that the process to be performed is a process of processing the image data, because the <DocumentProcess> tag appears in an element on line 1 of the process instruction data DA, and the CPU 202 operates based on the elements between the <DocumentProcess> tag and the </DocumentProcess> tag. Here, because one of the tags on line 2 of the process instruction data DA is a <WebService> tag, the CPU 202 determines that it is to perform a process of instructing other devices to process the document, generates the process identifier "B0002" in order to uniquely identify the process of instructing other devices to process the image data, and also names the process specified by the process identifier "B0002" "WebService" in order to associate the process identifier "B0002" with the process name "WebService". Moreover, because processing of the process identifier "B0002" is one of the processes to be performed by the server device 20A, the CPU 202 associates the process identifier "B0002" with the process identifier "B0001" (FIG. 12(b)).

Figure 14:
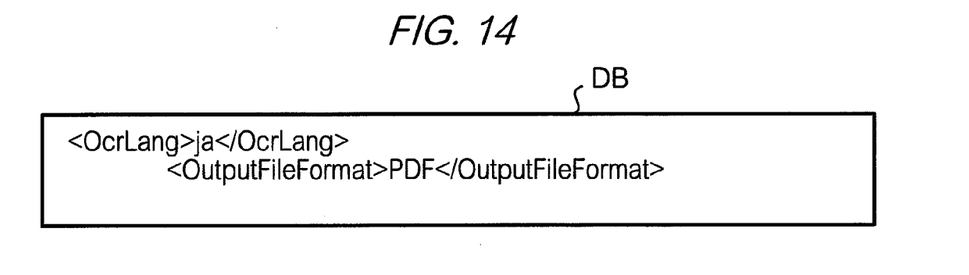
FIG. 14 is a diagram showing the contents of the process instruction data DB.

Next, because a <Name> tag appears on the line following the line with <WebService>, the CPU 202 extracts "Ocr" between the <Name> tag and the </Name> tag as the name of the process to be performed by other devices. Furthermore, because the text strings <Target>http://192.168.4.10/OcrService.amsx</Target> and <FileTransfer>attachment</FileTransfer> appear as elements and elements are inserted between the <Message> tag and the </Message> tag, the communication portion 210 is controlled by the CPU 202, and the image data and a message instructing the execution of the program specified by "OcrService.amsx" are sent to the server device 20B specified by the IP address "192.168.4.10" (step S5). Moreover, the elements between the <Message> tag and the </Message> tag are extracted from the process instruction data DA, and the process instruction data DB, representing the extracted elements (FIG. 14), is sent to the server device 20B (step S6).

When the image data, message, and process instruction data DB sent from the server device 20A are received by the communication portion 210 of the server device 20B, the CPU 202 of the server device 20B executes the application program 205C specified by "OcrService.amsx" according to the message and performs a process based on the process instruction data DB.

Figures 12C, 12D, 12E, 12F, 12G:
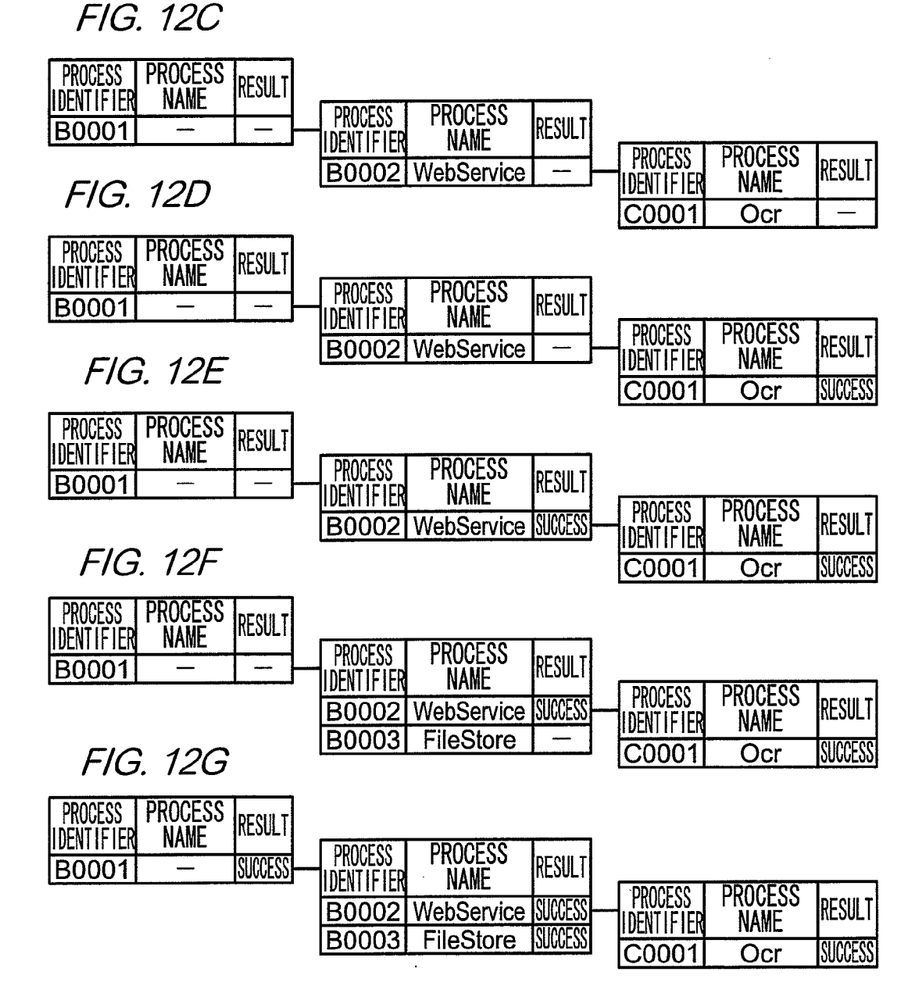

Specifically, the CPU 202 first analyzes the contents of the process instruction data DB from line 1 of the process instruction data DB after generating "C0001" as a process identifier in order to uniquely identify the process to be performed based on the process instruction data DB. Furthermore, this process identifier "C0001" is sent to the server device 20A (step S7), is associated with the "Ocr" process in the server device 20A, and is stored in the memory 205. Moreover, because the process identifier "C0001" is related to the process of the process identifier "B0002", in the server device 20A, the process identifier "C0001" is associated with the process identifier "B0002" (FIG. 12(c)).

On the other hand, in the server device 20B, the CPU 202 analyzes the process instruction data DB, and because "ja" follows the <OcrLang> tag and "PDF" follows the <OutputFileFormat> tag in the process instruction data DB, Japanese language character recognition is performed for the image represented by the received image, and recognition result data that represents the result of recognition is generated in PDF (Portable Document Format) format.

Then, when the process of character recognition is completed on the server device 20B, the CPU 202 first stores the process identifier "C0001" and the "success" process result data, indicating that the process of character recognition has been performed in the memory 205 of the server device 20B. Furthermore, communication portion 210 is controlled by the CPU 202, and recognition result data, the process identifier "C0001", and the "success" process result data are sent to the server device 20A (step S8).

When these are received by the communication portion 210 of the server device 20A, the CPU 202 of the server device 20A determines that the process specified by the process identifier "C0001" has been performed, because the content of the process result data is "success". Then, the received "success" process result data is associated with the process identifier "C0001" and the process name "Ocr" in the memory 205 and is stored (FIG. 12(e)). Furthermore, the CPU 202 determines that the process to be performed by other devices has been performed, because the received process result data is "success", and it associates the "success" process result data, which indicates that a process performed by other devices has been performed, with the process identifier "B0002" and the process name "WebService" and stores it in the memory 205 (FIG. 12(e)).

Then, when a process performed by other devices is completed, the CPU 202 of the server device 20A determines that it is to perform a process of storing the recognition result data in the memory 205, because line 11 of the process instruction data DA contains the <FileStore> tag, and it generates a process identifier "B0003" that uniquely identifies this process and also names the process specified by the process identifier "B0003" as "FileStore" in order to associate the process identifier "B0003" with the process name "FileStore". Furthermore, because processing of the process identifier "B0003" is one of the processes to be performed by the server device 20A, the process identifier "B0003" is associated with the process identifier "B0001" (FIG. 12(f)).

Next, because the <StoreLocation> tag appears on the line following the line with <FileStore>, the CPU 202 stores the recognition result data in a storage location in the memory 205 designated by the text between the <StoreLocation> tag and the </StoreLocation> tag. Then, when the recognition result data is stored on the server device 20A, the CPU 202 of the server device 20A first associates the process identifier "B0003", the process name "FileStore" and the "success" process result data, which indicates that the process of storing the recognition result data has been performed, with each other, and stores them in the memory 205 of the server device 20A (FIG. 12(g)). Furthermore, because the tag following the </FileStore> tag in the process instruction data DA is a </DocumentProcess> tag, with the element being finished in the process instruction data DA and the process to be performed based on the process instruction data DA being completed, the CPU 202 associates the "success" process result data with the process identifier "B0001" and stores it in the memory 205 (FIG. 12(g)).

When the process to be performed based on the process instruction data DA is completed on the server device 20A, the communication portion 210 is controlled by the CPU 202, and data stored in the memory 205 (FIG. 12(g)) is sent to the image-forming device 10 (step S9).

Figures 11A, 11B:
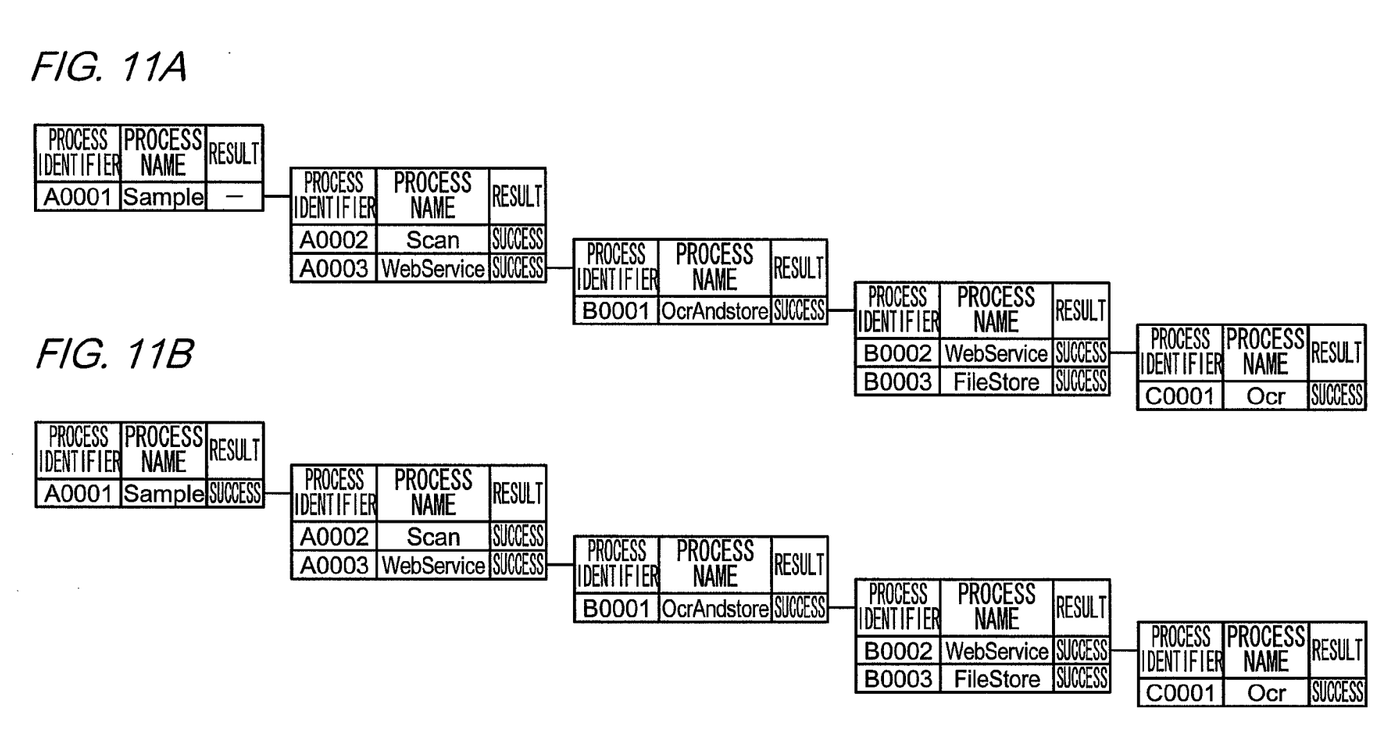
FIG. 11 is a diagram showing data stored in the image-forming device 10.

Then, when these data are received by the communication portion 110 of the image-forming device 10, the CPU 102 stores the received data in the memory 105 (FIG. 10(e)) and determines that the process performed by other devices has been performed. Then, it associates the "success" process result data, indicating that a process to be performed by other devices has been performed, with the process identifier "A0003" and the process name "WebService" in order to store it in the memory 105 (FIG. 11(a)). Furthermore, when these are stored in the memory 105, the CPU 102 determines that the process to be performed based on the process instruction data D has been performed, and associates the "success" processing data with the process identifier "A0001" and the process name "Sample" in order to store it in the memory 105 (FIG. 11(b)).

Figure 15:
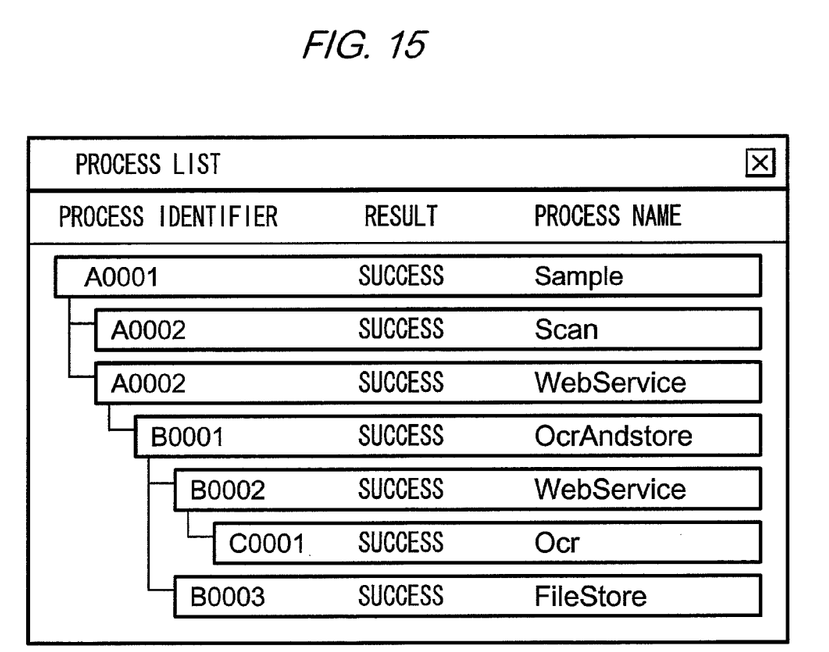
FIG. 15 is a diagram illustrating a screen displayed on the display 107.

Subsequently, the CPU 102 reads out the process identifier, process name and process result data stored in the memory 105, and displays them on the display 107 as illustrated in FIG. 15. Furthermore, when displaying this, in association with a process identifier, the contents and process names of the process result data that form a set with the process identifier may be displayed as shown in FIG. 15. Moreover, as shown in FIG. 15, they may be displayed so that the association between processes may be understood, based on the association of each process identifier in FIG. 11(b). In addition, in the present example of the action, because the process identifier "A0002" and the process identifier "A0003" have been associated with the process identifier "A0001", FIG. 15 hierarchically displays the process identifier "A0001" associated with the process identifier "A0002" and the process identifier "A0003", and it hierarchically displays the process identifier "B0001" associated with the process identifier "A0003", because the process identifier "B0001" has been associated with the process identifier "A0003". Furthermore, because the process identifier "B0002" and the process identifier "B0003" have been associated with the process identifier "B0001", FIG. 15 hierarchically displays the process identifier "B0001" associated with the process identifier "B0002" and the process identifier "B0003". Moreover, because the process identifier "C0001" has been associated with the process identifier "B0002", it hierarchically displays the process identifier "C0001" associated with the process identifier "B0002". This display mode shows the relationship between the processes performed by the device that instructed the execution of the processes and the processes performed by the other devices instructed to execute processes by the device.

Modified Examples

One exemplary embodiment of the present invention has been described above, but the present invention is not limited by the aforementioned exemplary embodiment and can be implemented in various other forms. For example, the aforementioned exemplary embodiment may be modified as follows in order to implement the present invention.

In the aforementioned exemplary embodiment, the start time and end time of a process may also be associated with its process identifier and stored. Furthermore, in the aforementioned exemplary embodiment, if the communication portion of each device is a communication interface having a MAC (Media Access Control) address, a process identifier that includes the MAC address may be generated. Moreover, in the aforementioned exemplary embodiment, if the process to be performed is not successfully completed, there may be an "error" as the contents of the process result data, indicating that it has not been successfully completed.

In the aforementioned exemplary embodiment, process instruction data in which lines 5 to 12 of the process instruction data D being deleted may be created with the computer device 30 in order to perform the operation of instructing the execution of a process represented by this process instruction data on the computer device 30, causing the server device 20B to perform a process of character recognition and causing the server device 20A to store the recognition result data. Furthermore, in the aforementioned exemplary embodiment, the image-forming device 10 may instruct the server device 20B to recognize characters in image data, wherein the image-forming device 10 may receive the recognition result data of the character recognition sent from the server device 20B to the image-forming device 10. Then, the image-forming device 10 may instruct the server device 20A to store this recognition result. Moreover, in the aforementioned exemplary embodiment, the server device 20B may instruct another server device to perform the process.

The contents of the processes to be performed by each device are not limited to those in the aforementioned exemplary embodiment. For example, the server device may be caused to perform a process of attaching image data to an e-mail message in order to send it, and may be caused to perform a process such as color conversion and image processing of the image data. Furthermore, the image-forming device 10 may incorporate a facsimile communication function and be caused to perform the process of transmitting a facsimile of the image data.

In the aforementioned exemplary embodiment, a history server device that stores data regarding a process may be connected to the communication line 40 in order to cause the history server device to store data regarding the processes to be performed by each device. Furthermore, in the case of this configuration, when a device connected to the communication line 40 sends a message to other devices requesting a process, the output destination of the data regarding the process may be included, and the history server device may be this output destination.

Each of the aforementioned programs may be provided by storing it on computer readable memory media such as magnetic recording media (magnetic tape, magnetic disk (HDD (hard disk drive), FD (floppy disk), etc.), optical recording media (optical disc (CD (compact disc)), DVD (digital versatile disc)), etc.), magneto-optic media (MO), and semiconductor memory, and installing it on each device. Furthermore, it is also possible to download it via a communication line and install it on each device.

The foregoing description of the embodiments of the present invention is provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An information-processing device comprising:
an execution unit that executes a first part of a process, based on process instruction data representing the process including the first part of the process, a second part of the process, and a third part of the process, the process instruction data instructing the information-processing device to execute the first part of the process, instructing the information-processing device to instruct an external device to execute the second part of the process, and instructing the external device to instruct a second external device to execute the third part of the process;
an instruction unit that instructs the external device to execute the second part of the process, based on the process instruction data;
a receiving unit that receives from the external device second status data that indicates whether execution of the second part of the process by the external device is completed and third status data that indicates whether execution of the third part of the process by the second external device is completed;
a memory that stores a history of the process, the history comprising first status data that indicates whether execution of the first part of the process is completed, the second status data received by the receiving unit that indicates whether the execution of the second part of the process is completed, and the third status data received by the receiving unit that indicates whether the execution of the third part of the process is completed; and
a display that displays the history of the process, the displayed history of the process illustrating a hierarchical relationship between the first part of the process performed by the information-processing device at a hierarchically higher level of the displayed history, the second part of the process performed by the external device at a hierarchically lower level of the displayed history, and the third part of the process performed by the second external device at a second hierarchically lower level of the displayed history, the higher level of the displayed history determined based on the process instruction data instructing the information-processing device to execute the first part of the process, the lower level of the displayed history determined based on the process instruction data instructing the information-processing device to instruct the external device to execute the second part of the process, and the second lower level of the displayed history determined based on the process instruction data instructing the external device to instruct the second external device to execute the third part of the process,
wherein the displayed history of the process comprises a first process name of the first part of the process performed by the information-processing device, a second process name of the second part of the process performed by the external device, and a third process name of the third part of the process performed by the second external device, and
wherein the first part of the process executed by the information-processing device and the second part of the process executed by the external apparatus are executed in parallel, and the third part of the process is sequentially allocated to the second external device by the external device based on the process.

2. The information-processing device according to claim 1, wherein the external device includes a server device that performs the second part of the process and sends a result of the second part of the process to the information-processing device.

3. The information-processing device according to claim 1, wherein the external device includes a first server device that provides the information processing device with a result of the second part of process and the second external device includes a second server device that performs the third part of the process upon receipt of a request by the first server device.

4. An information-processing system comprising:
an information-processing device comprising:
an execution unit that executes a first part of a process, based on process instruction data representing the process including the first part of the process, a second part of the process, and a third part of the process, the process instruction data instructing the information processing device to execute the first part of the process, instructing the information processing device to instruct a server device to execute the second part of the process, and instructing the server device to instruct a second server device to execute the third part of the process;
an instruction unit that transmits to the server device an instruction to execute the second part of the process, based on the process instruction data;
a receiving unit that receives from the server device second status data that indicates whether execution of the second part of the process by the server device is completed and third status data that indicates whether execution of the third part of the process by the second server device is completed;
a memory that stores a history of the process, the history comprising first status data that indicates whether execution of the first part of the process is completed, the second status data received by the receiving unit that indicates whether the execution of the second part of the process is completed, and the third status data received by the receiving unit that indicates whether the execution of the third part of the process is completed; and
a display that displays the history of the process, the displayed history of the process illustrating a hierarchical relationship between the first part of the process performed by the information processing device at a hierarchically higher level of the displayed history, the second part of the process performed by the server device at a hierarchically lower level of the displayed history, and the third part of the process performed by the second server device at a second hierarchically lower level of the displayed history, the higher level of the displayed history determined based on the process instruction data instructing the information processing device to execute the first part of the process, the lower level of the displayed history determined based on the process instruction data instructing the information processing device to instruct the server device to execute the second part of the process, and the second lower level of the displayed history determined based on the process instruction data instructing the server device to instruct the second server device to execute the third part of the process, and the server device comprising:
an accepting unit that accepts the instruction transmitted by the instruction unit;
a second execution unit that executes the second part of the process in response to the accepting unit accepting the instruction; and a sending unit that sends the second status data and the third status data to the information-processing device, wherein the displayed history of the process comprises a first process name of the first part of the process performed by the information-processing device, a second process name of the second part of the process performed by the external device, and a third process name of the third part of the process performed by the second external device, and wherein the first part of the process executed by the information-processing device and the second part of the process executed by the external apparatus are executed in parallel, and the third part of the process is sequentially allocated to the second external device by the external device based on the process.

5. The information-processing system according to claim 4, wherein the server device further comprises a communication unit that communicates with the second server device so as to cause the second server device to perform the third part of the process.

6. A non-transitory storing medium storing a program that causes an information processing device to execute a method of displaying a processing history of a process, the method comprising:

receiving process instruction data, the process instruction data instructing the information processing device to execute a first part of the process, instructing the information processing device to instruct an external device to execute a second part of the process, and instructing the external device to instruct a second external device to execute the third part of the process;

executing the first part of a process, based on the process instruction data;

instructing the external device to execute the second part of the process, based on the process instruction data;

receiving from the external device second status data that indicates whether execution of the second part of the process by the external device is completed and third status data that indicates whether execution of the third part of the process by the second external device is completed;

storing the history of the process, the history comprising first status data that indicates whether execution of the first part of the process is completed, the second status data that indicates whether the execution of the second part of the process is completed, and the third status data received by the receiving unit that indicates whether the execution of the third part of the process is completed; and displaying the history of the process, the displayed history of the process illustrating a hierarchical relationship between the first part of the process performed by the information-processing device at a hierarchically higher level of the displayed history, the second part of the process performed by the external device at a hierarchically lower level of the displayed history, and the third part of the process performed by the second external device at a second hierarchically lower level of the displayed history, the higher level of the displayed history determined based on the process instruction data instructing the information-processing device to execute the first part of the process, the lower level of the displayed history determined based on the process instruction data instructing the information-processing device to instruct the external device to execute the second part of the process, and the second lower level of the displayed history determined based on the process instruction data instructing the external device to instruct the second external device to execute the third part of the process, wherein the displayed history of the process comprises a first process name of the first part of the process performed by the information-processing device, a second process name of the second part of the process performed by the external device, and a third process name of the third part of the process performed by the second external device, and wherein the first part of the process executed by the information-processing device and the second part of the process executed by the external apparatus are executed in parallel, and the third part of the process is sequentially allocated to the second external device by the external device based on the process.

7. The storing medium according to claim 6, wherein the external device includes a server device that performs the second part of the process and sends a result of the second part of the process to the information-processing device.

8. The storing medium according to claim 6, wherein the external device includes a first server device that provides the information processing device with a result of the second part of process and the second external device includes a second server device that performs the third part of the process upon receipt of a request by the first server device.

* * * * *